United States Patent [19]
Yuki et al.

[11] Patent Number: 5,504,636
[45] Date of Patent: Apr. 2, 1996

[54] MAGNETIC DISK APPARATUS HAVING IMPROVED SUPPORT FOR HEAD ASSEMBLY

[75] Inventors: Tetsuo Yuki, Hiratsuka; Yuji Nishimura, Odawara; Tomio Suzuki, Hiratsuka; Tsuyoshi Takahashi, Odawara; Naoto Uemura, Hiratsuka, all of Japan

[73] Assignee: Hitachi, Ltd., Tokyo, Japan

[21] Appl. No.: 183,000

[22] Filed: Jan. 18, 1994

[30] Foreign Application Priority Data

Jan. 20, 1993 [JP] Japan ................... 5-007515

[51] Int. Cl.$^6$ .................. G11B 5/55; G11B 21/08
[52] U.S. Cl. .................. 360/97.01; 360/106
[58] Field of Search .................. 360/105–106, 360/97.01–97.02, 109

[56] References Cited

U.S. PATENT DOCUMENTS

| | | | |
|---|---|---|---|
| 3,721,967 | 3/1973 | Englert et al. | 360/106 |
| 4,745,503 | 5/1988 | Muraoka et al. | 360/106 |
| 4,853,808 | 8/1989 | Lutz | 360/98.01 |
| 4,974,107 | 11/1990 | Liu et al. | 360/106 |
| 5,012,372 | 4/1991 | Isomura et al. | 360/106 |
| 5,029,029 | 7/1991 | Hatchett et al. | 360/106 |
| 5,136,446 | 8/1992 | Yamamoto et al. | 360/106 |

FOREIGN PATENT DOCUMENTS 2-278577  11/1990  Japan.

Primary Examiner—John H. Wolff
Attorney, Agent, or Firm—Kenyon & Kenyon

[57] ABSTRACT

A magnetic disk apparatus has a rail support which supports guide rails for guiding a carriage on which heads are mounted. The rail support is positioned outside a magnet of a voice coil motor and mounted on a frame. The guide rails are disposed so as to extend across a cavity in the rail support and have their opposite end portions attached to the rail support. The guide rails do not vibrate even if the voice coil motor receives a reaction during head seeking, whereby the head positioning accuracy can be improved and the storage capacity can be increased. The rigidity of the guide rails is increased by supporting the opposite ends of the guide rails. This structure and a coaxial arrangement of a motor coil allow the overall length of the carriage and, hence, the overall size of the apparatus to be reduced.

7 Claims, 5 Drawing Sheets

MAGNETIC DISK APPARATUS HAVING IMPROVED SUPPORT FOR HEAD ASSEMBLY

BACKGROUND OF THE INVENTION

This invention relates to an apparatus having a magnetic disk for storing data.

In the field of storage apparatuses using magnetic disks, there are strong demands for a higher storage capacity which may be achieved by increasing the speed at which a surface of a magnetic disk as a storage medium is accessed with a magnetic head, and by improving the magnetic head positioning accuracy; and for a smaller overall size or installation space of a storage apparatus.

For example, in the apparatus disclosed in Japanese Unexamined Patent Publication No. Hei 2-278577 (U.S. Pat. No. 5,029,029 which is a combination of application Ser. No. 324,261, filed on Mar. 15, 1989), a coil of a voice coil motor is supported on a carriage and disposed coaxially with a portion of the carriage to which head assemblies are fixed, and the overall length of the carriage is reduced, whereby the speed of the operation of positioning magnetic heads is increased. Further, guide rails for guiding the carriage are fitted and fixed in cylindrical grooves formed in a magnet of the voice coil motor. The need for members for fixing the rails is thereby eliminated, so that the overall size of the mechanism is reduced.

With this arrangement, however, it is not possible to stabilize or reduce the distance between disks and sliders supporting the magnetic heads, because the guide rails fixed to a head of the voice coil motor are vibrated by a seek reaction which is caused when the carriage is moved for seeking and because the carriage itself is also vibrated by the vibration of the guide rails. That is, it is not possible to increase the recording density on each disk, so there is a limit to the increase in storage capacity.

SUMMARY OF THE INVENTION

Under the circumstances, an object of the present invention is to achieve accurate positioning of a magnetic head by reducing vibration of a voice coil motor which is otherwise caused by a seek reaction.

Another object of the present invention is to provide a structure for supporting a voice coil motor whereby a magnetic head can travel across a magnetic disk surface in a floating manner at a small distance therefrom.

According to the present invention, there is provided a disk apparatus comprising at least one disk provided as a magnetic recording medium, a drive mechanism for rotating the disk, at least one head assembly including a head for writing information on the disk and for reading information from the disk, a carriage for supporting the head assembly, guide rails for guiding the carriage so that the carriage is movable in a radial direction of the disk, a voice coil motor having a coil and a magnet for causing the carriage to move, and a case for accommodating the above-mentioned components. The apparatus also comprises a rail support in the form of a hollow frame opened at opposite ends. The rail support is positioned outside the magnet of the voice coil motor and is disposed in the case that serves as a frame in which the above-mentioned components are accommodated. The guide rails extend through the coil of the voice coil motor and across the cavity in the rail support and have their opposite end portions attached to the rail support.

The operation of the magnetic disk apparatus in accordance with the present invention will be described below.

When the drive mechanism rotates the disk and when electric current is caused to flow in the coil of the voice coil motor, the carriage moves along the guide rails to move a head to a desired position on the disk. At this time, most of a seek reaction caused by the operation of the voice coil motor is not transmitted to the guide rails because the guide rails are mounted on the rail support which is independent of a case which supports the magnet constituting the voice coil motor, and because the rails are supported on a member formed of the case and the rail support and having a high rigidity and a very large mass. Therefore, the head can be positioned with improved accuracy. Since only the opposite ends of each of the guide rails are supported on the rail support having a high rigidity, the length of the portions of the guide rails attached to the rail support can be reduced. It is therefore possible to increase the range of movement of the carriage on the guide rails. Conversely, the overall length of the guide rails can be reduced by an amount corresponding to the possible increase in the range of carriage movement. Further, the coil of the voice coil motor is disposed coaxially with the carriage so that the overall length of the carriage can be reduced. Therefore, the size of the apparatus can be reduced despite the existance of the rail support.

The present invention has been achieved also by considering changes in a thermal environment.

In the magnetic disk apparatus of the present invention, the arrangement may preferably be such that one end of each guide rail is fixed to the rail support while the other end is supported on the rail support in such a manner that a thermal expansion along a longitudinal center axis of the rail support is allowed. By this arrangement, even if the guide rails and the rail support are formed of different materials, that is, there is a difference between the thermal expansion coefficients of the guide rails and of the rail support, the amount of deformation of the guide rails due to a difference in the thermal expansion is diminished or limited. It is therefore possible to stabilize the head positioning irrespective of a change in ambient temperature. Also, a surface of each guide rail which contacts the rail support may be formed in a plane on the longitudinal center axis of the guide rail to ensure that the guide rail is not curved and the distance between the head and the disk can be kept unchanged even if the guide rail is elongated with an increase in ambient temperature. It is therefore possible to stabilize the head positioning accuracy.

DETAILED DESCRIPTION

Figure 1:
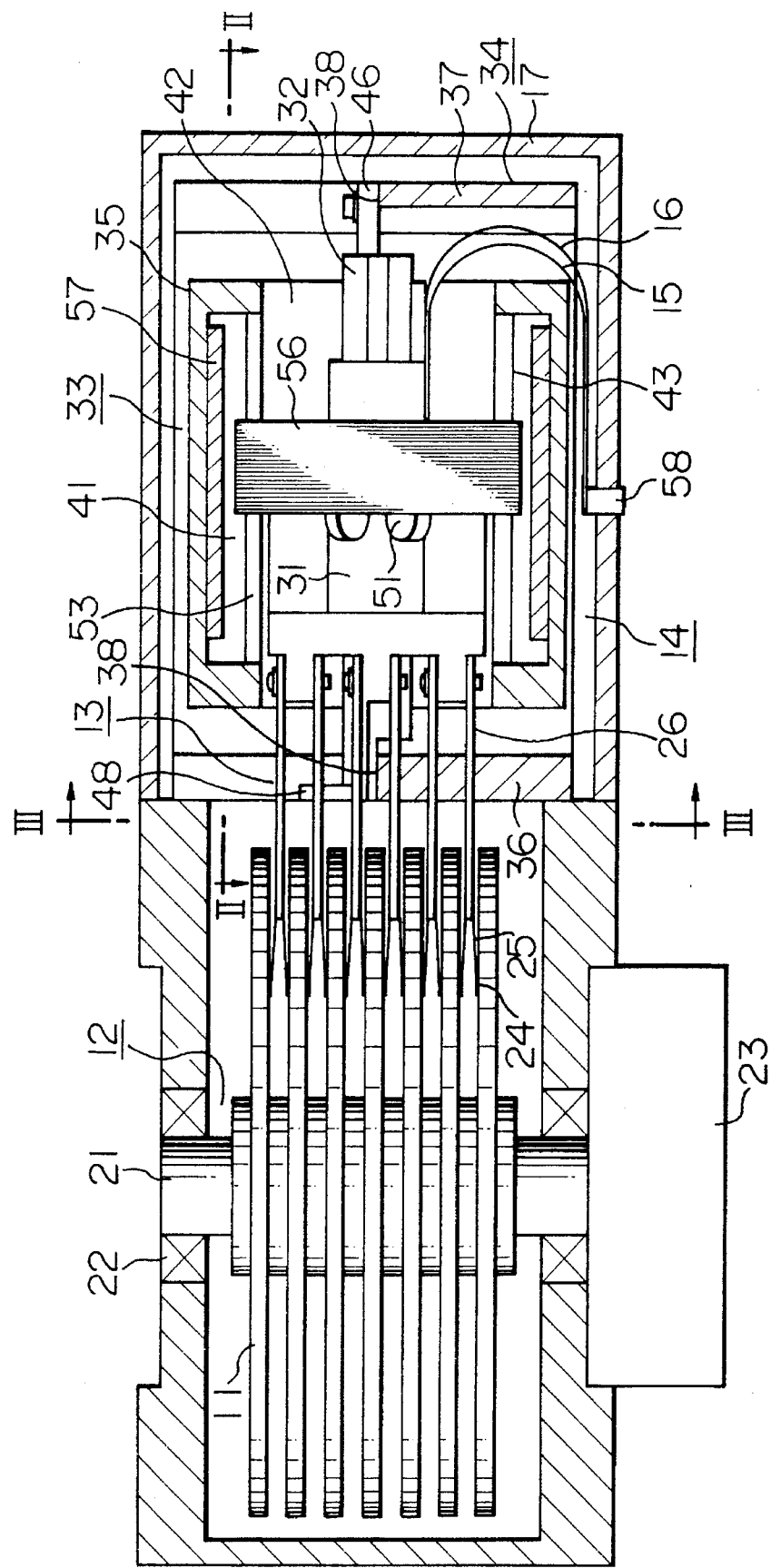
FIG. 1 is a cross-sectional view of an embodiment of a magnetic disk apparatus in accordance with the present invention.
Figure 2:
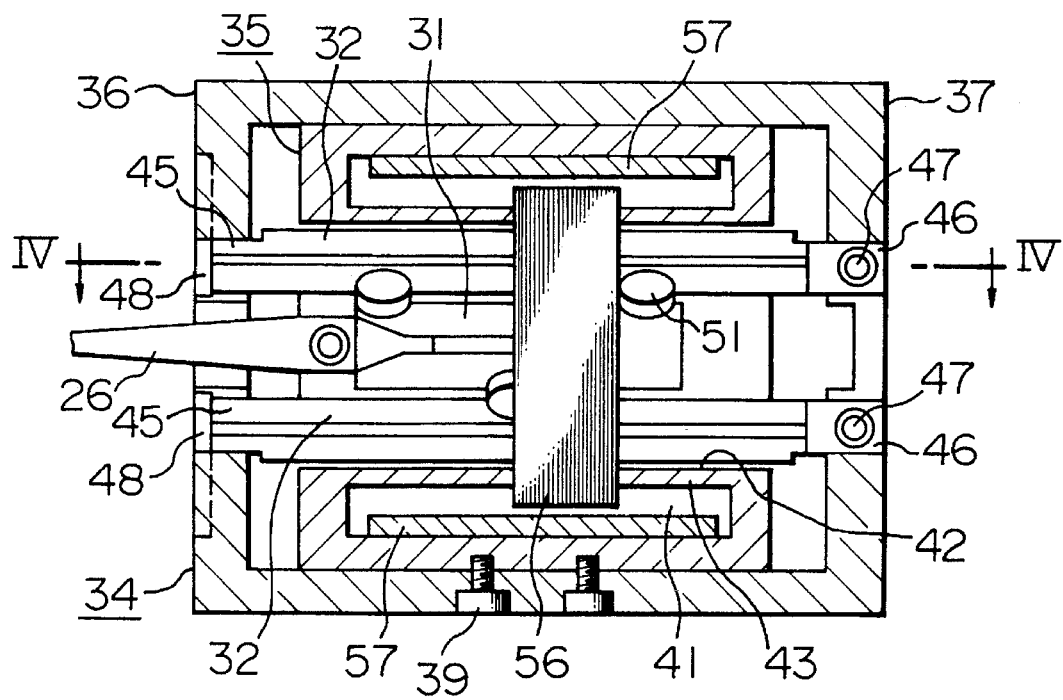
FIG. 2 is a cross-sectional view taken along the line II—II in FIG. 1, showing in top view a positioning mechanism.
Figure 3:
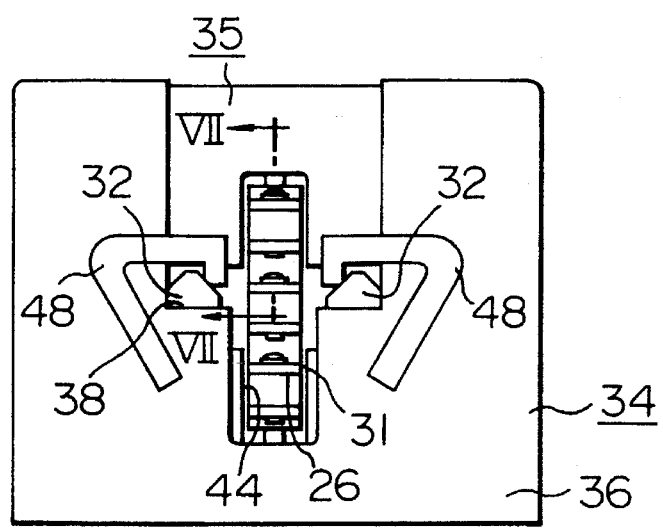
FIG. 3 is a cross-sectional view taken along the line III—III in FIG. 1, showing in front view the positioning mechanism.

A magnetic disk apparatus in accordance with an embodiment of the present invention has, as shown in FIGS. 1 through 3, a plurality of magnetic disks 11 provided as magnetic recording media, a drive mechanism 12 for rotating the disks 11, head assemblies 13 including heads for writing information on the disks and for reading information from the disks, a positioning mechanism 14 for supporting the head assembly 13 and for moving the heads in a radial direction of the disks, flexible printed circuit boards 15 for transmitting information from the heads to an external unit, a flexible printed circuit board 16 for supplying current to a drive source for the positioning mechanism 14, and a case 17 in which these components are accommodated.

In the drive mechanism 12, a spindle 21 is supported on the case 17 through bearings 22. A motor 23 is disposed outside the case 17 and has a shaft connected to a lower end of the spindle 21. The disks 11 are mounted on the spindle 21 with spacers interposed between the disks 11. The disks 11 and the spacers are integrally united with the spindle 21 by clamps fitted and fixed to the spindle 21, thereby enabling the disks 11 to be rotated together with the spindle 21.

The head assemblies 13 are disposed between the disks 11 so that their end portions on which the heads are mounted face the recording surfaces of the disks 11 while the opposite end portions are supported on the positioning mechanism 14. Each head assembly 13 has a slider 24 on which the corresponding head is supported, a head arm 25 formed of a spring member or the like, and a rigid guide arm 26. The slider 24 is supported on an end of the head arm 25 through a gimbal (not shown), the other end of the head arm being fixed to the guide arm 26.

The positioning mechanism 14 has a carriage 31, guide rails 32 for guiding the carriage 31, a voice coil motor 33 for moving the carriage 31 along the guide rails 32, a rail support 34 for supporting the guide rails 32, and a motor support 35 for supporting the voice coil motor 33.

Figure 4:
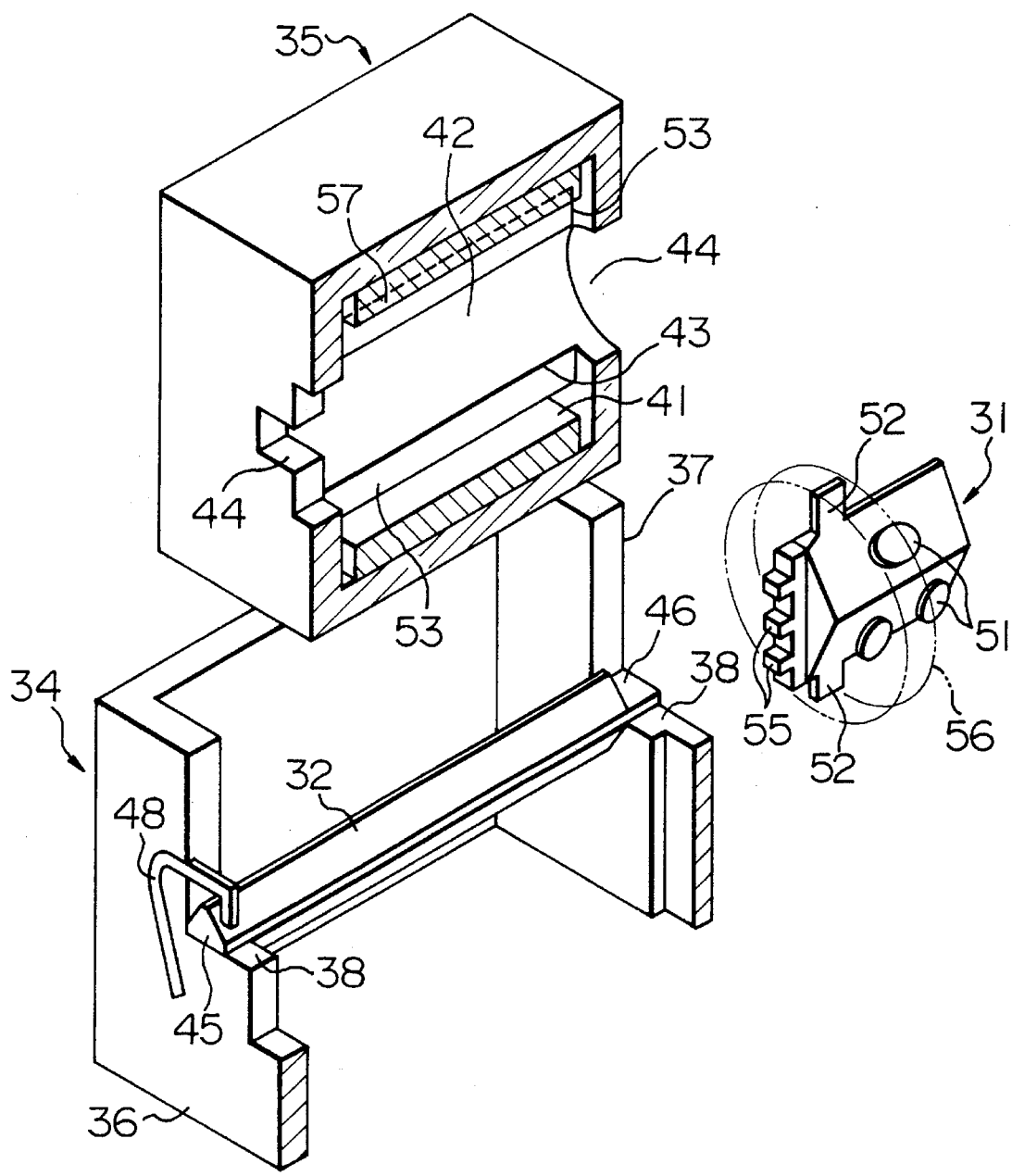
FIG. 4 is a partially fragmentally exploded view of the positioning mechanism.

As clearly shown well in FIG. 4, the rail support 34 is in the form of a hollow frame or a box opened at opposite sides and disposed in and fixed to the case 17 with the open sides of the rail support disposed at the top and the bottom. The rail support 34 has notches or meshing portions formed in a side wall 36 facing the disks 11 and in a side wall 37 opposite to the side wall 36. Seat surfaces 38 for supporting the guide rails 32 are formed on the notches.

The motor support 35 (FIG. 4) has a box-like shape having such a width as to be fitted in a space defined in the rail support 34. As shown in FIG. 2, the motor support 35 is fitted in the rail support 34 and is connected to the rail support 34 by bolts 39. A cylindrical space 41 is formed in the motor support 35. An inner space 42 is defined in the space 41 by a tubular partition wall 43. Openings 44 are formed in end walls disposed at the opposite ends of the inner space 42.

Figure 5:
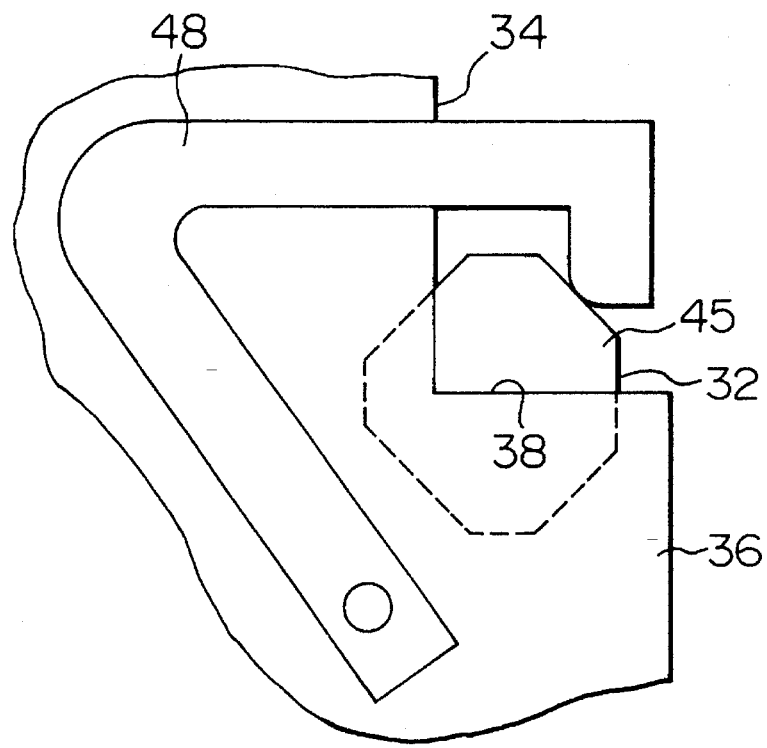
FIG. 5 is a enlarged front view of a support structure for a guide rail and a rail support shown in FIG. 4.
Figure 6:
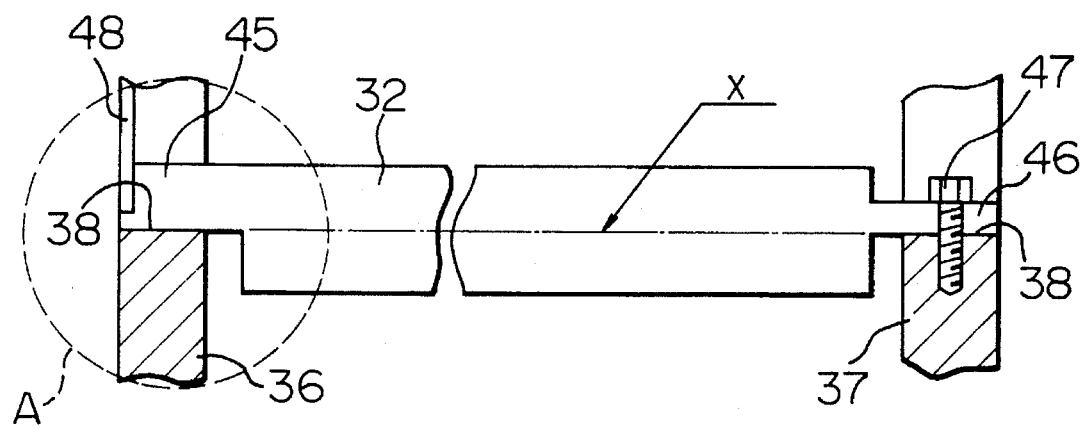
FIG. 6A is an enlarged cross-sectional view of the guide rail and the rail support taken along the line IV—IV in FIG. 2, showing enlarged details in sections 38a and 38b.
FIGS. 6B and 6C respectively show in an enlarged scale the portions of the guide rail and the rail support encircled by a broken line circle A in FIG. 6A when the guide rail and the rail support are relatively displaced to different positions due to thermal expansions thereof.
Figure 6A:
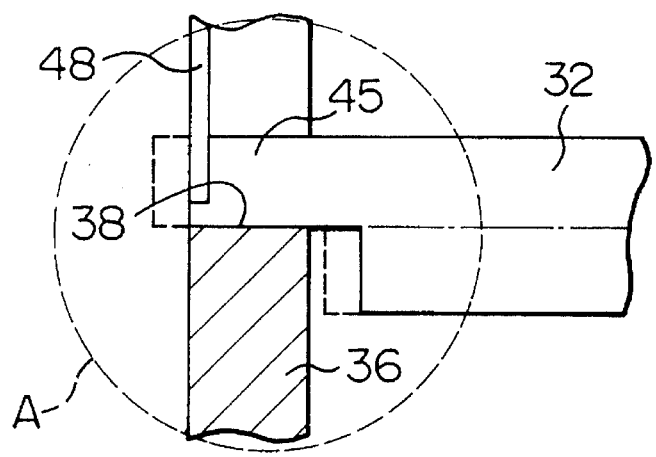

Each guide rail 32 is formed of a member having a rhomboid polygonal cross section, extends between the side walls 36 and 37 of the rail support 34 through the inner space 42 and the openings 44, and has its opposite ends placed on the seat surfaces 38 on the rail support 34. An end portion 45 of the guide rail 32 which contacts the seat surface 38 on the side wall 36 has such a shape that its half is cut off along a plane containing its longitudinal center axis x to provide a bottom surface 45A, as shown in FIGS. 5 and 6A. Another end portion 46 of the guide rail 32 which contacts the seat surface 38 on the side wall 37 has a plate-like shape having a bottom surface 46A extending on its longitudinal center axis x as best seen in FIG. 6A.

The guide rail 32 is connected to the rail support 34 such that the end portions 45 and 46 are supported on the side walls 36 and 37 with the bottom surfaces 45A and 46A of their end portions 45 and 46 on the guide rail center axis being placed on the seat surfaces 38 on the rail support 34. The end portion 46 is fixed to the wall 37 by a bolt 47, while the end portion 45 is engaged by a spring member 48. The spring member 48 is formed by cutting out a generally V-shaped member from a spring member (see FIG. 5). The spring member 48 is so disposed that the direction of its thickness is parallel to the longitudinal direction of the guide rail 32, with its free end pressed against the guide rail 32 to urge the guide rail 32 against the seat surface 38 on the side wall 36, and with the other end engaged fixed in the notch or groove formed in the side wall 36 of the rail support 34.

The carriage 31 is placed between the guide rails 32 set in this manner. Rollers 51 are provided on opposite side surfaces of the carriage 31. The carriage 31 is supported on the guide rails 32 by placing the rollers 51 on the guide rails 32 and can travel on the guide rails by rotating the rollers 51. Three rollers 51 are provided on each side of the carriage 31. Two of the rollers 51 on one side of the carriage 31 roll on a travel surface formed on an upper portion of the corresponding guide rail 32, while the other one of the three rollers 51 rolls on another travel surface formed on a lower portion of the guide rail 32, as shown in FIG. 4. One of the six rollers 51 is mounted on the carriage 31 through a mechanism for applying a pre-pressing force, while the other five of the six roller 51 are directly mounted on shafts extending from the carriage 31. Each of the rollers 51 itself is formed of, for example, a roller bearing. Projections 52 are formed on upper and lower portions of the carriage 31 so as to extend toward the outer space 41. The projections 52 extend through slits 53 formed in the partition wall 43 of the motor support 35 into the outer space 41. The slits 53 are formed parallel to the guide rails 32 and each have a length related to the distance through which the carriage 31 moves.

Figure 7:
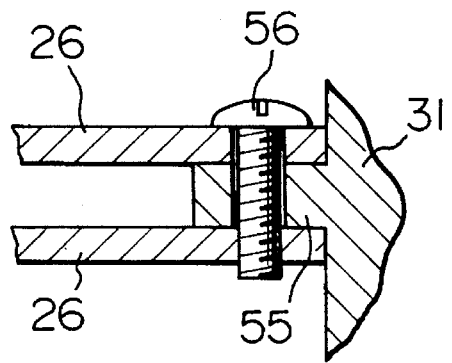
FIG. 7 is an enlarged cross-sectional view of a carriage and a head assembly taken along the line VII—VII fin FIG. 3.

The head assemblies 13 (FIG. 1) are mounted on the carriage 31. When the carriage 31 travels along the guide rails 32, the head assemblies 13 move in a radial direction of the disks 11 through the opening 44 (FIG. 4) in the motor support 35 facing the disks 11 and through the notch in the rail support 34. The head assemblies 13 are connected to the carriage 31 in such a manner that, as shown in FIG. 7, each adjacent pair of guide arms 26 of the head assemblies 13 are brought into contact with two surfaces of a projection 55 provided on the carriage 31 and are fastened to each other with a screw 56. The screw 56 extends through holes formed in the upper one of the pair of guide arms 26 and the projection 52 with the head of the screw placed on the upper arm side. A threaded end of the screw 56 opposite to the head is screwed into a threaded hole formed in the lower guide arm 26.

The voice coil motor 33 (FIG. 1) has a coil 56 and a magnet 57. The coil 56 is disposed in the outer space 41 in the motor support 35 and is bonded to end portions of the projections 52 of the carriage 31 extending into the outer space 41 of the motor support 35. The magnet 57 is disposed in the outer space 41 of the motor support 35 and is fixed to a wall surface defining the outer space 41 of the motor support 35.

The flexible printed circuit boards 15 and 16 are disposed in the case 17 and superposed on each other, as shown in FIG. 1. One end of each of the printed circuit boards 15 and 16 is fixed to the carriage 31, while the other end is led between the carriage 31 and the guide rails 32 to the outside of the motor support 35 and connected to a connector 58 attached to the case 17 outside the rail support 34. The flexible printed circuit board 15 serves for connection between the magnetic heads and a circuit for processing signals from the heads. Terminals of the printed circuit board 15 on its end portion fixed to the carriage 31 are connected to wires which are led from the heads along the head arms 25 and the guide arms 26. Terminals of the printed circuit board 15 connected to the connector 58 are connected to an external signal processor through the connector 58. The flexible circuit board 16 serves for transmission of a signal for driving the voice coil motor 33. Terminals of the flexible printed circuit board 16 disposed adjacent the carriage side are connected to the coil 56, while terminals adjacent the connector 58 are connected to an external drive circuit through the connector 58.

In this magnetic disk apparatus, the guide rails 32 are supported on the rail support 34 only at their opposite ends and have a high rigidity. Therefore, the range of movement of the carriage 31 on the guide rails 32 can be increased by shortening the end portions 38, 45 and 46 of the guide rails 32 attached to the rail support 34, so that the length of the guide rails 32 can be reduced by an amount corresponding to the possible increase in the range of movement of the carriage 31. Further, the coil 56 of the voice coil motor is disposed coaxially with the carriage 31, the overall length of the carriage 31 is reduced and the flexible printed circuit boards 15 and 16 are laid curvedly in the case 17 while being superposed on each other. Therefore, the overall size of the magnetic disk apparatus can be reduced despite of the existence of the rail support 34.

Access to the disks 11 (FIG. 1) is performed in such a manner that the spindle 21 is rotated by the motor 23, the carriage 31 is thereafter moved along the guide rails 32 together with the head assemblies 13 while a current flowing through the coil 56 is controlled, and the heads on the sliders 24 are thereby moved straight in a radial direction of the disks 11. When a current is caused to flow through the coil 56 during the head seek operation performed in this manner, the magnet 57 receives a reaction. Since the guide rails 32 are placed on the rail support 34 which is independent of the motor support 35 on which the magnet 57 is mounted, and since the rail support 34 is fixed to the case 17, the mass attached to the guide rails 32 is sufficiently large in comparison with that of the motor support 35. Therefore, the vibration of the guide rails 32 caused by the above-mentioned reaction is limited and the resulting vibration of the carriage 31 during head seeking is very small. The influence of the vibration on the head positioning accuracy is negligibly small. It is therefore possible to reduce the distance between the disks 11 and the sliders 24 supporting the heads to thereby increase the recording density of each disk 11 and, hence, the storage capacity of the magnetic disk apparatus.

Figure 6B:
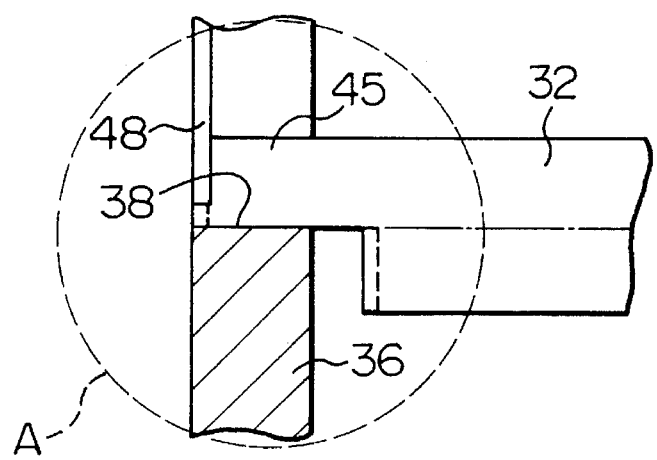

In this magnetic disk apparatus, one end of each guide rail 32 is fixed to the rail support 34 and the other end is retained by the spring member 48 in such a manner that thermal expansion of the guide rail 32 in its longitudinal direction is allowed. Even if the guide rails 32 and the rail support 34 are formed of different materials, that is, there is a difference between the thermal expansion coefficients of the guide rails 32 and the rail support 34, the guide rails 32 can be fully expanded as shown in FIG. 6B when the temperature raises in the case 17 and/or outside the case 17. The deformation of the guide rails 32 due to thermal stress can be prevented in this manner. Therefore, there is substantially no risk of offsets of the heads from tracks on the disks, i.e., off-tracking, and the distance between the disks 11 and the sliders 24 supporting the heads is stabilized. Further, each guide rail 32 is fixed to the seat surface 38 on the rail support 34 through its end portion 46 having the flat surface 46A extending on the longitudinal center line x. Therefore, even if the ambient temperature rises to cause a thermal expansion of the rail support 34 (the walls 36 and 37) greater than that of the guide rail 32, as shown in FIG. 6C, due to the difference between the thermal expansion coefficients of the rail support 34 and the guide rail 32, a moment that is caused on a centroid of the guide rail 32 and that acts to bend the guide rail 32 with a point of action disposed on the portion of the guide rail 32 in contact with the rail support 34 is zero or very small, because a point of action of a force generated by the thermal expansion at the contacting portions of the rail support 34 and the guide rail 32 is always located on the longitudinal center axis passing through the centroid of the guide rail 32. Therefore, the guide rail 32 is not curved while the rail support 34 expands simply, whereby the distance between the disks 11 and the sliders 24 supporting the heads is further stabilized. Since the distance between the disks 11 and the sliders 24 supporting the heads is stabilized as described above, the distance can be reduced to increase the recording density of each disk and, hence, the storage capacity. Moreover, the numbers of disks 11 and the head assemblies 13 in the disk apparatus can be increased in such a manner that each adjacent pair of head assemblies 13 are disposed on the opposite sides of the corresponding projection 55 of the carriage 31 and are fastened together, that is, the head assemblies can be arranged at smaller intervals. It is therefore possible to further increase the storage capacity of the magnetic disk apparatus.

Further, the coil 56 of the voice coil motor is supported on the projections 52 extending from the carriage 31 and are spaced from the connection between the guide arms 26 and the carriage projections 55. Therefore, the increase in temperature caused by heat developed in the coil 56 is small at a portion of the carriage 31 adjacent the coil 56. Accordingly, the elongation of the carriage 31 at a position adjacent the coil 56 is small, so that there is no risk of any considerable offsets of some of the heads of the head assemblies 13 from disk tracks, i.e., off-tracking, due to the difference between the elongations of a portion of the carriage closer to the coil 56 and at another portion thereof remote from the coil 56. This is combined with the stabilization of the distance between the sliders 24 and the disks 11 to assure that the head positioning accuracy can be maintained always stably.

According to the present invention, as described above, a seek reaction caused when the voice coil motor is operated is not transmitted to the guide rails, so that the heads can be positioned with a high accuracy. It is, therefore, possible to reduce the distance between the disks and the sliders supporting the heads and, thus, to increase the recording density of each disk, whereby a magnetic disk apparatus having a larger storage capacity can be obtained.

What is claimed is:

1. A disk apparatus comprising:

a drive mechanism for rotating at least one disk;

at least one head assembly including a head for writing information on the disk and for reading information from the disk;

a carriage for supporting said head assembly;

guide rail means for guiding said carriage so that said carriage is movable in a radial direction of the disk;

a coil coupled to said carriage;

a motor support enclosure having a magnet, said magnet applying an electromagnetic force to said coil wherein in response to said electromagnetic force said coil moves said carriage along said guide rail means;

a rail support positioned outside said motor support enclosure, said rail support supporting said guide rail means; and a case accommodating said carriage, said guide rail means and coil and said motor support and which supports said rail support;

wherein said motor support has a cavity, and said guide rail means extends through said coil and across the cavity of said motor support, said guide rail means having opposite ends attached to said rail support.

2. A disk apparatus according to claim 1, wherein said magnet is fixed to said motor support;

said motor support is fixed to said rail support;

said guide rail means extends through said coil and across a cavity of said motor support, said guide rail means having opposite ends attached to said rail support; and said rail support is fixed to said case, whereby said motor support, said rail support, said guide rail means and said case are fixed together.

3. A disk apparatus comprising:

a drive mechanism for rotating at least one disk;

at least one head assembly including a head for writing information on the disk and for reading information from the disk;

a guide rail means for guiding said carriage in a radial direction of the disk;

a coil coupled to said carriage;

a motor support having a magnet for applying an electromagnetic force to said coil wherein, in response to said electromagnetic force said coil moves said carriage along said guide rail means; and a rail support for supporting said guide rail means such that one end of said guide rail means is fixed to said rail support while the other end of said guide rail means is supported by said rail support substantially freely in a longitudinal direction of said guide rail means;

wherein said guide rail means are disposed to extend through said coil and across a cavity of said motor support.

4. A disk apparatus according to claim 3, wherein said carriage has at least two projections, and said coil is fixed solely by said projections.

5. A disk apparatus according to claim 3, wherein said guide rail means and said rail support are in contact with each other in a plane containing a substantial central region of said guide rail means and a substantial longitudinal center axis of said guide rail means.

6. A disk apparatus according to claim 3, wherein the other end of said guide rail means is free in the longitudinal direction of said guide rail means with respect to a thermal expansion and is attached to said rail support.

7. A disk apparatus comprising:

a drive mechanism for rotating at least one disk;

at least one head assembly including a head for writing information on the disk and for reading information from the disk;

a carriage for supporting said head assembly;

guide rail means for guiding said carriage so that said carriage is movable in a radial direction of the disk;

a coil coupled to said carriage;

said carriage having at least two projections, said coil being fixed to said carriage through said projections;

a motor support enclosure having a cavity and a magnet for applying an electromagnetic force to said coil wherein in response to said electromagnetic force said coil moves said carriage along said guide rail means;

a rail support having a frame-like shape and disposed outside said motor support enclosure, said rail support supporting said guide rail means;

said magnet being fixed to said motor support;

said motor support being fixed to said rail support;

said guide rail means being disposed so as to extend through said coil and across the cavity of said motor support, said guide rail means being attached to said support such that one end of said guide rail means is fixed to said rail support while the other end of said guide rail means is supported by said rail support substantially freely in a longitudinal direction of said guide rail means, said guide rail means and said rail support being in contact with each other in a plane containing a substantial central region of said guide rail means and a substantial longitudinal center axis of said guide rail means; and a case to which said motor support and said rail support are fixed and in which said components are substantially accommodated.

\* \* \* \* \*

UNITED STATES PATENT AND TRADEMARK OFFICE
CERTIFICATE OF CORRECTION

PATENT NO. : 5,504,636
DATED : April 2, 1996
INVENTOR(S) : Tetsuo YUKI et al.

It is certified that error appears in the above-indentified patent and that said Letters Patent is hereby corrected as shown below:

| Column | Line | |
|--------|------|---|
| 1 | 18 | Change "combination" to --continuation--. |
| 3 | 7 | Change "fin" to --in--. |
| 5 | 30 | After "portions" delete "38,". |
| 5 | 40 | After "despite" delete "of". |

Signed and Sealed this

Eighth Day of October, 1996

Attest:

BRUCE LEHMAN

Attesting Officer        Commissioner of Patents and Trademarks